United States Patent [19]

Sheriff

[11] Patent Number: 5,228,006
[45] Date of Patent: Jul. 13, 1993

[54] HIGH RESOLUTION BEAM FORMER APPARATUS

[75] Inventor: Robert W. Sheriff, Davidsonville, Md.

[73] Assignee: Westinghouse Electric Corp., Pittsburgh, Pa.

[21] Appl. No.: 916,353

[22] Filed: Jul. 20, 1992

[51] Int. Cl.$^5$ .............................................. G01S 15/00
[52] U.S. Cl. .................................... 367/103; 342/368
[58] Field of Search ................ 367/135, 103; 342/380, 342/382, 371, 368, 173

[56] References Cited

U.S. PATENT DOCUMENTS 4,947,176  8/1990  Inatsune et al. ...................... 367/173

Primary Examiner—Daniel T. Pihulic
Attorney, Agent, or Firm—Dean Schron

[57] ABSTRACT

An array of receiver elements in a radar or sonar system is synthetically elongated resulting in a narrower beam pattern. This is accomplished by sampling each output signal of the receiver elements, converting the signal to I and Q components for determination of a magnitude and phase angle. The phase angle is modified by a certain phase modulation factor $f_m$ and new I and Q components are calculated using the modified phase angle. The modified I and Q components from all of the received elements are combined for display purposes.

5 Claims, 8 Drawing Sheets

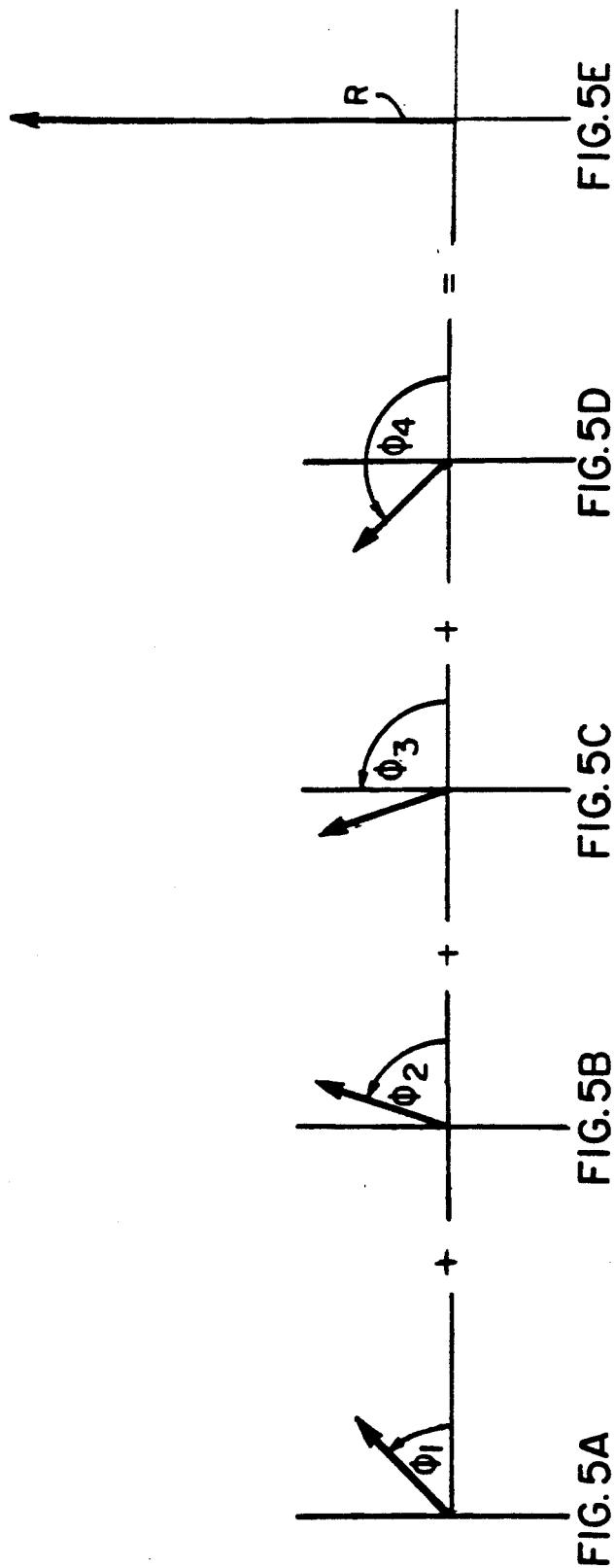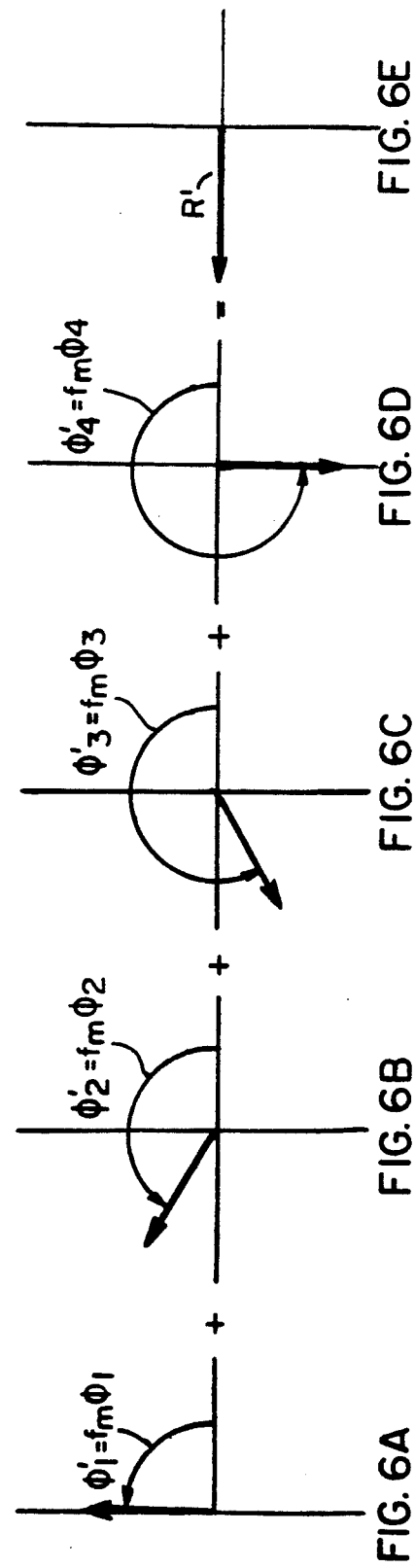

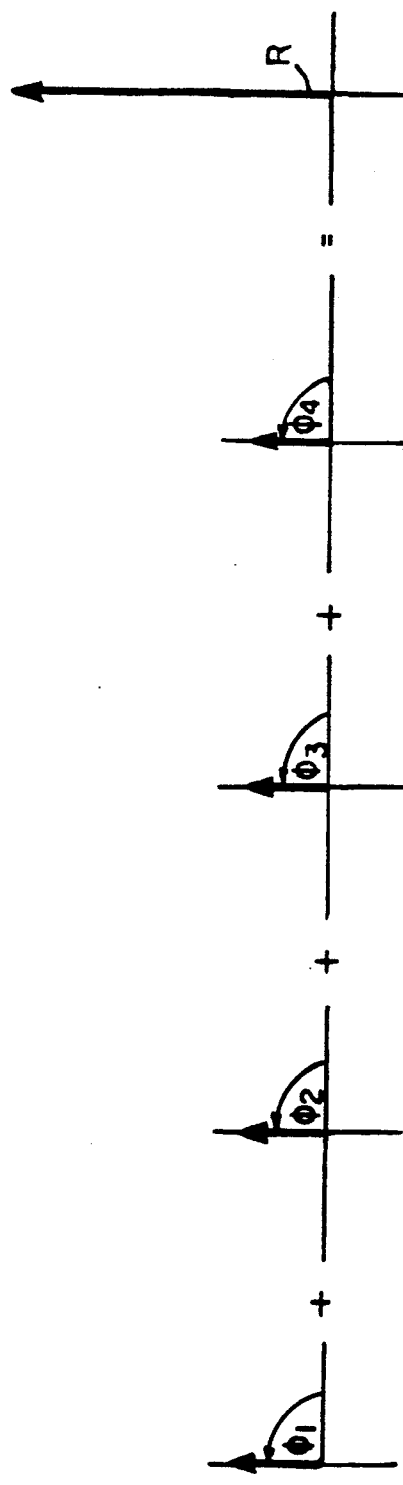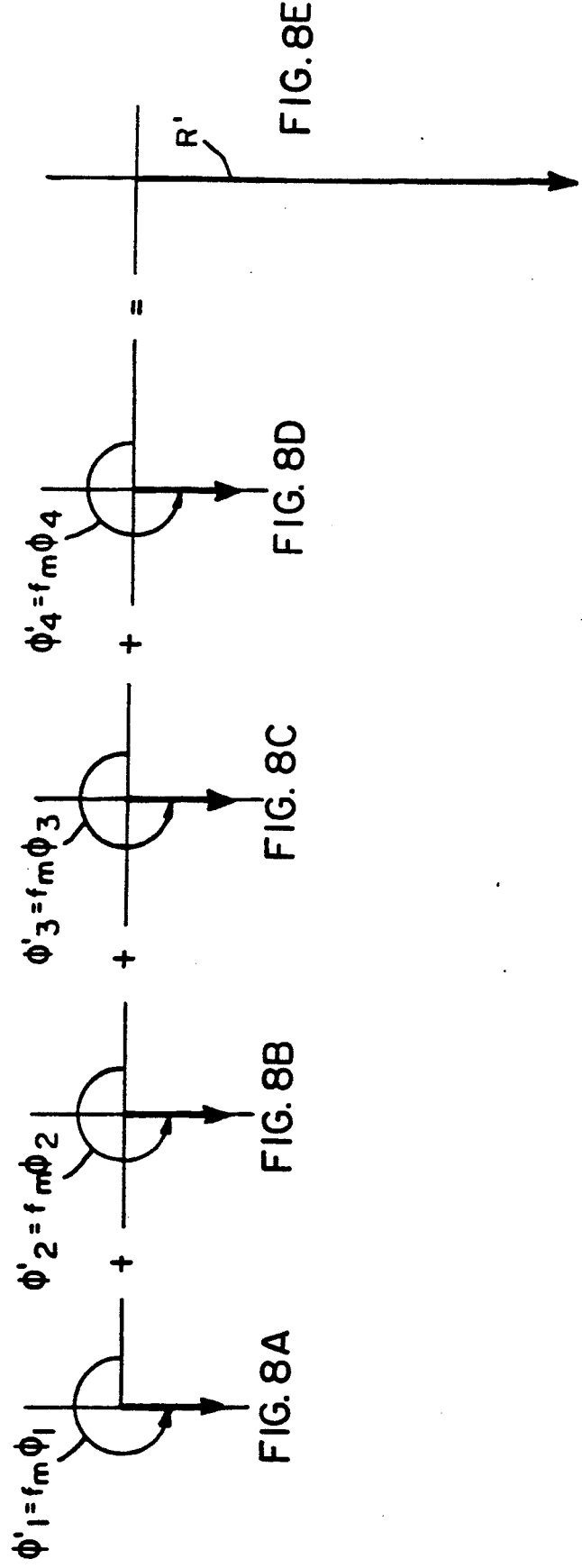

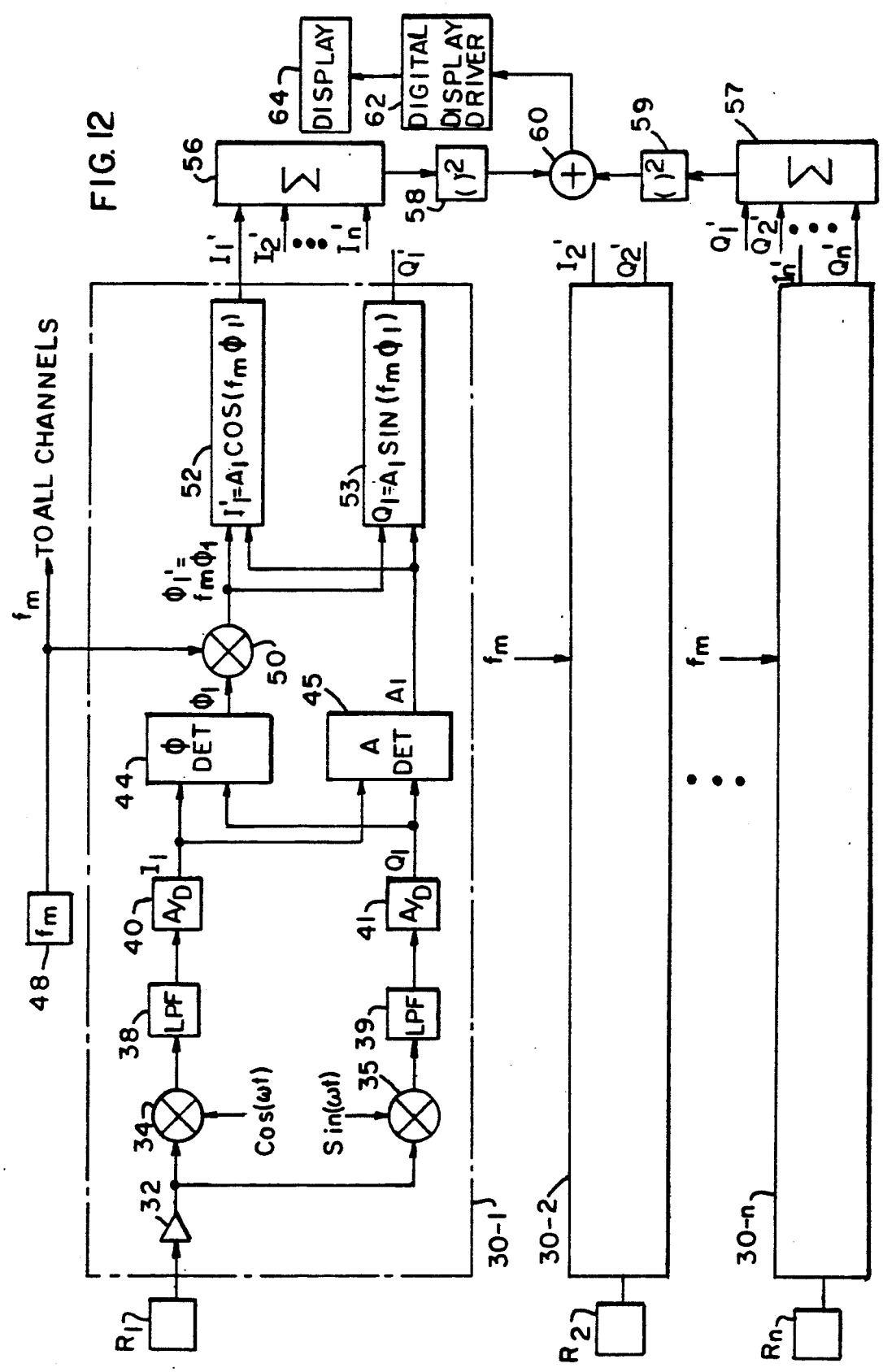

HIGH RESOLUTION BEAM FORMER APPARATUS

BACKGROUND OF THE INVENTION

1. Field of the Invention

The invention in general relates to radar or sonar systems, and more particularly, to a system for forming an extremely narrow receiver beam.

2. Background Information

In radar or sonar systems, electromagnetic or acoustic energy, as the case may be, is transmitted toward a target area. Reflected energy from a target in the area is detected by a receiver array comprised of a plurality of receiver elements, the corresponding output signals of which are processed to provide a target signal.

The response of the array varies with the direction of incoming energy relative to the array, such response being defined by a beam pattern having a predetermined beam width.

The resolution of the system is determined by the beam width and it is generally desirable to be able to resolve small and closely spaced objects. Finer resolution, that is, narrowing the beam width, is typically achieved by increasing the receiver array aperture. However, since increased aperture is generally achieved only through increased platform size, and additional receiver elements with associated electronics, it is not a cost effective option for systems which are size and power limited. The present invention provides for a system which significantly improves resolution without increasing aperture size and is applicable for both radar and sonar applications.

SUMMARY OF THE INVENTION

High resolution beam former apparatus is provided which includes a plurality of receiver elements arranged in an array for receiving energy reflected from a target in a target field. Each receiver element is operable to provide an output signal in response to receipt of the reflected energy. A plurality of signal processing channels is provided with each being connected to receive the output signal from a respective one of the receiver elements. The signal processing channel is operable, in repetitive sampling cycles, to derive the in-phase (I) and quadrature (Q) components of the element output signal. A corresponding amplitude and phase angle of the sampled signal is then calculated and means are provided for multiplying the derived phase angle in each signal processing channel by a constant phase modulation factor, $f_m$, to derive a modified phase angle. The signal processing channel is operable to compute modified I and Q components utilizing the modified phase angle and means are provided for combining all of the modified I and Q components of all of the signal processing channels to derive target signals which may be used for display purposes.

BRIEF DESCRIPTION OF THE DRAWINGS

FIGS. 5A through 8E are vector diagrams illustrating the operation of the present invention;

FIG. 12 is a block diagram illustrating one embodiment of the present invention.

BRIEF DESCRIPTION OF THE PREFERRED EMBODIMENT

Figure 1:
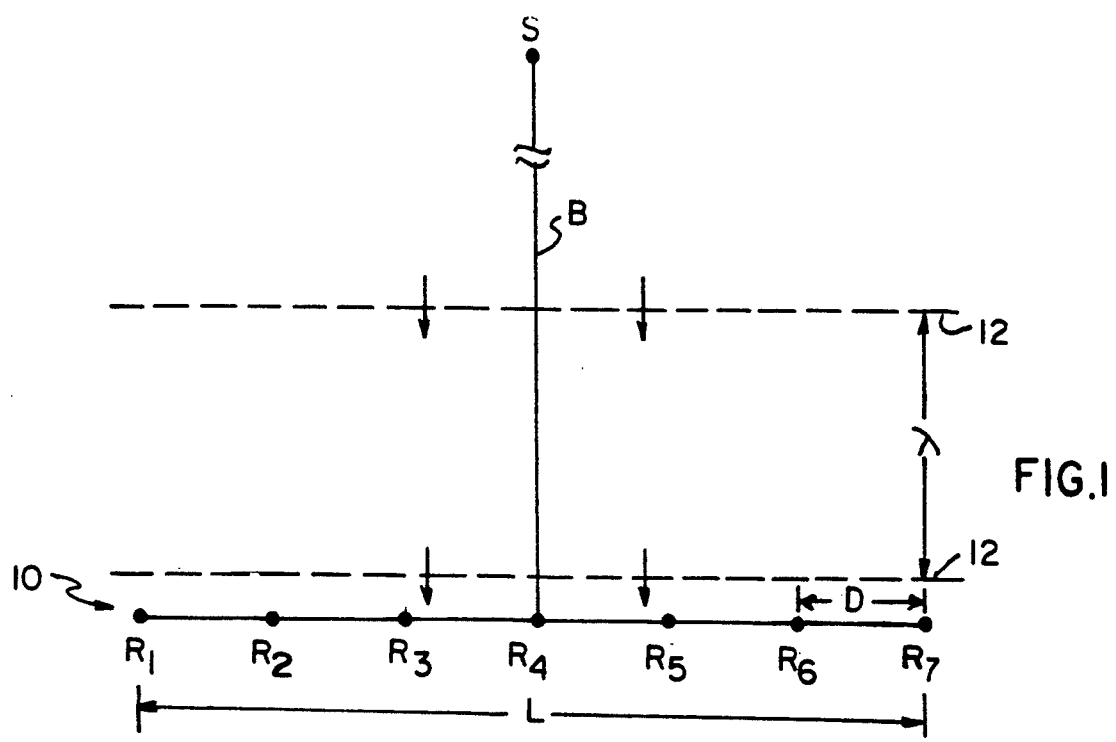
FIGS. 1 and 2 illustrate the impingement of energy upon a receiver array and at respectively different angles.

FIG. 1 illustrates an array 10 of receiver elements $R_1$ to $R_7$ separated by a distance D and arranged as a linear array of length L. Axis B represents the axis of the array and the direction of maximum response. Situated on axis B in the far field is a point source of energy S which, for purposes of explanation, radiates a sinusoidal waveform having a wavelength $\lambda$. Numerals 12 represent wavefronts of constant phase and magnitude, separated by a distance $\lambda$, and as the energy is received by elements $R_1$ through $R_7$, they will provide output signals all of which have the same phase and magnitude at any instant of time. If the signals output by elements $R_1$ through $R_7$ were to be added coherently, as in a conventional beam forming operation, then the resultant signal would have a magnitude N times greater than any individual element since the signals all added in-phase, where N is the number of element responses added.

Figure 2:
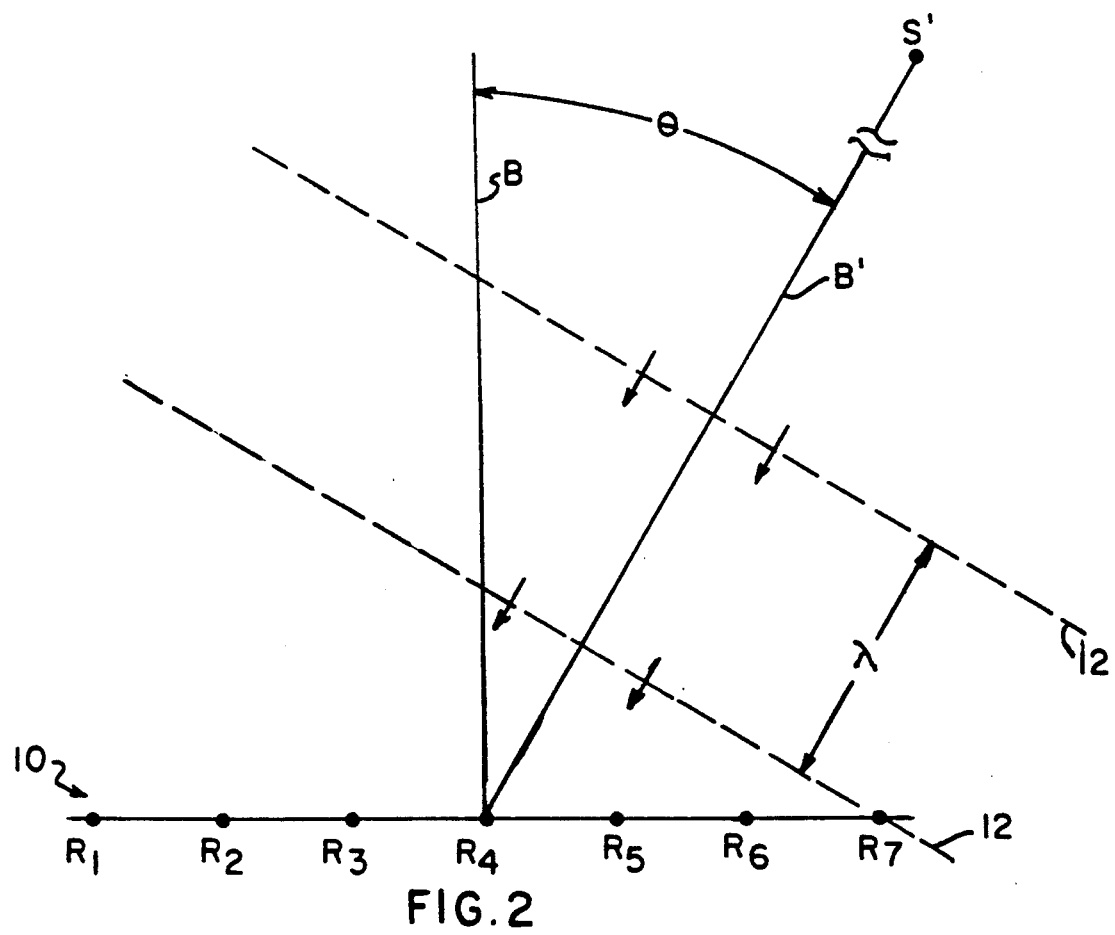

In FIG. 2, energy is impinging upon the array 10 from a source S' located on an axis B' at an angle $\theta$ with respect to the array axis B. Under such circumstances, at any instant of time, the output signals of all the elements will not be of the same phase angle. Now if the signals output by elements $R_1$ through $R_7$ were to be added coherently in a beamforming operation, the resultant signal would not increase significantly since the signals are not adding in-phase (destructive interference). In general, the further off-axis the target becomes, the more out-of-phase the elemental signals become relative to one another, causing the beamformed output to fall off rapidly with increasing $\theta$.

Although FIGS. 1 and 2 illustrate a far field source, by way of example, the invention is also applicable to near field (spherical wave) sources by the well-known technique of focussing to remove wavefront curvature.

Figure 3:
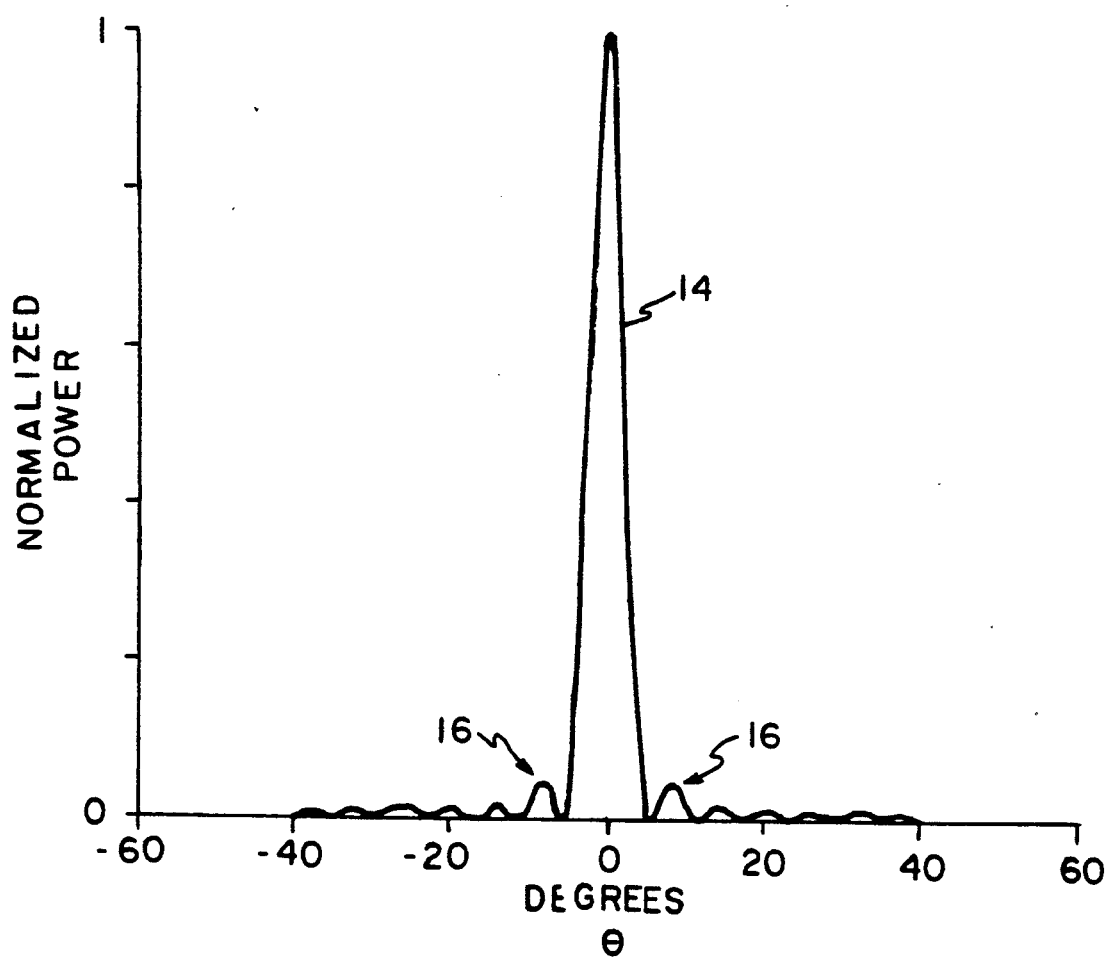
FIG. 3 illustrates a typical beam pattern.

The response of the array as a function of the angle $\theta$ is the beam pattern. Once example of a beam pattern is illustrated in FIG. 3 wherein a response is plotted for a theoretical transducer having twenty elements, with the spacing between elements being equal to $\frac{1}{2}$ a wavelength, that is $D=0.5 \lambda$. The angle $\theta$, in degrees, is plotted on the horizontal axis and the normalized response is plotted on the vertical axis. The beam pattern includes a main lobe 14 and a plurality of side lobes 16.

Figure 4A:
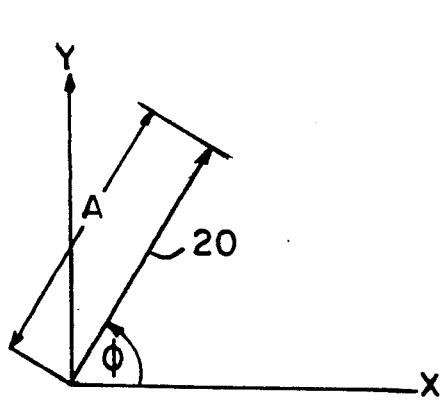
FIGS. 4A and 4B are vector diagrams to aid in an understanding of the operation of the present invention.
Figure 4B:
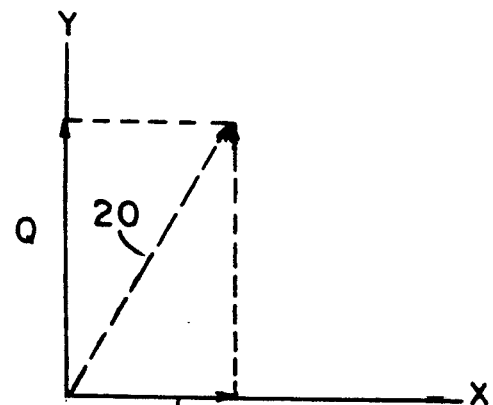

Each receiver element output signal at any instant of time can be represented by a vector having a certain magnitude and phase. By way of example, FIG. 4A illustrates, in an XY coordinate system, a vector 20 having a magnitude A and a phase $\phi$. The vector, representing a receive element output voltage may be resolved into mutually orthogonal components. For example, as illustrated in FIG. 4B, vector 20 has been resolved into mutually orthogonal components lying on the X and Y axes respectively. The in-phase (I) component lying on the X axis represents the real part of the vector while the quadrature (Q) component lying on the Y axis represents the imaginary part of the vector. Accordingly, from trigonometry the I and Q components may be determined knowing the magnitude and phase of the vector, and conversely, if the I and Q components are known, the magnitude and phase of the vector may be derived.

In the present invention, the phase of each element output signal is determined, in repetitive sampling cycles, and multiplied by a predetermined modulation factor, $f_m$, which has the effect of further reducing the off axis response of the array. This operation may be demonstrated with respect to FIGS. 5 and 6 to which reference is now made.

For purposes of illustration, a four receiver element array will be considered and FIGS. 5(a)-5(d) illustrate the outputs of the respective elements, each being represented by a rotating vector at a certain instant of time in its rotation such that each vector is disposed at a respective angle $\phi$. The in-phase component of the vector represents the real component of the instantaneous magnitude of the sinusoidal output voltage, and the Q component represents the imaginary component thereof. Thus in FIGS. 5(a)-5(d), the vectors lie at respective phase angles $\phi_1$-$\phi_4$. When these individual receiver element output signals are combined vectorially, the resultant array output signal will be defined by vector R in FIG. 5(e).

In accordance with the present invention, the phase angles are multiplied by a constant modulation factor $f_m$ resulting in modified phase angles $\phi'_1$ through $\phi'_4$ illustrated in FIGS. 6(a)-6(d) and wherein for purposes of illustration, $f_m=2$. Combining all of the vectors yields a resultant output signal R' which is almost half the magnitude of vector R of FIG. 5 thereby having the effect of reducing the off axis response.

Although the modulation will reduce the off axis response, it will not diminish the on axis response and this may be demonstrated with reference to FIGS. 7 and 8. As discussed in FIG. 1, for an on axis impingement of an energy wave, all of the receiver elements will provide identical output signals. For the 4 element example of FIG. 7, these output signals are illustrated in FIGS. 7(a)-(d) with the result of the vector combination being illustrated in FIG. 7(e) by the vector R. Modulation of the phase angles by a factor $f_m=2$, as was the case with respect to FIGS. 5 and 6, results in a vector orientation as illustrated in FIGS. 8(a)-(d), the vector combination of which yields resultant R' in FIG. 8(e) with the magnitude R' being identical to the magnitude R of FIG. 7(e) prior to the modulation process.

Therefore, it is seen that with the modulation process of the present invention, the on axis response remains undiminished while the off axis response is significantly reduced.

Figure 9:
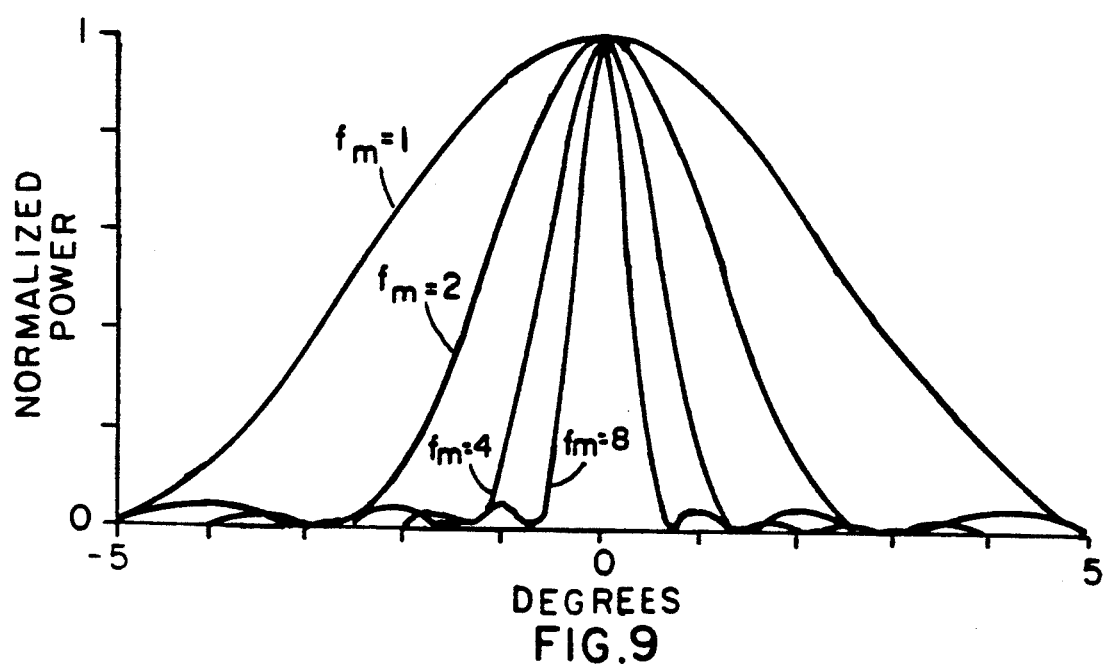
FIG. 9 illustrates the results of the present invention utilizing modulation factors of different values.

This is equivalent to narrowing the main lobe of the beam such as is illustrated in FIG. 9 wherein beam patterns are plotted with modulation factors $fm$ of 1 (that is, equivalent to no modulation) 2, 4 and 8. In general, the beam width is inversely proportional to the length of the array; the longer the array, the narrower the beam. Accordingly, modulating the phase angle reduces receiver element responses as if they were separated by distances equivalent to their true spacing multiplied by the modulation factor. Since the number of elements actually remains the same, their separation has been synthetically increased without the requirement for a longer platform with additional receiver elements and associated electronics.

Figure 10:
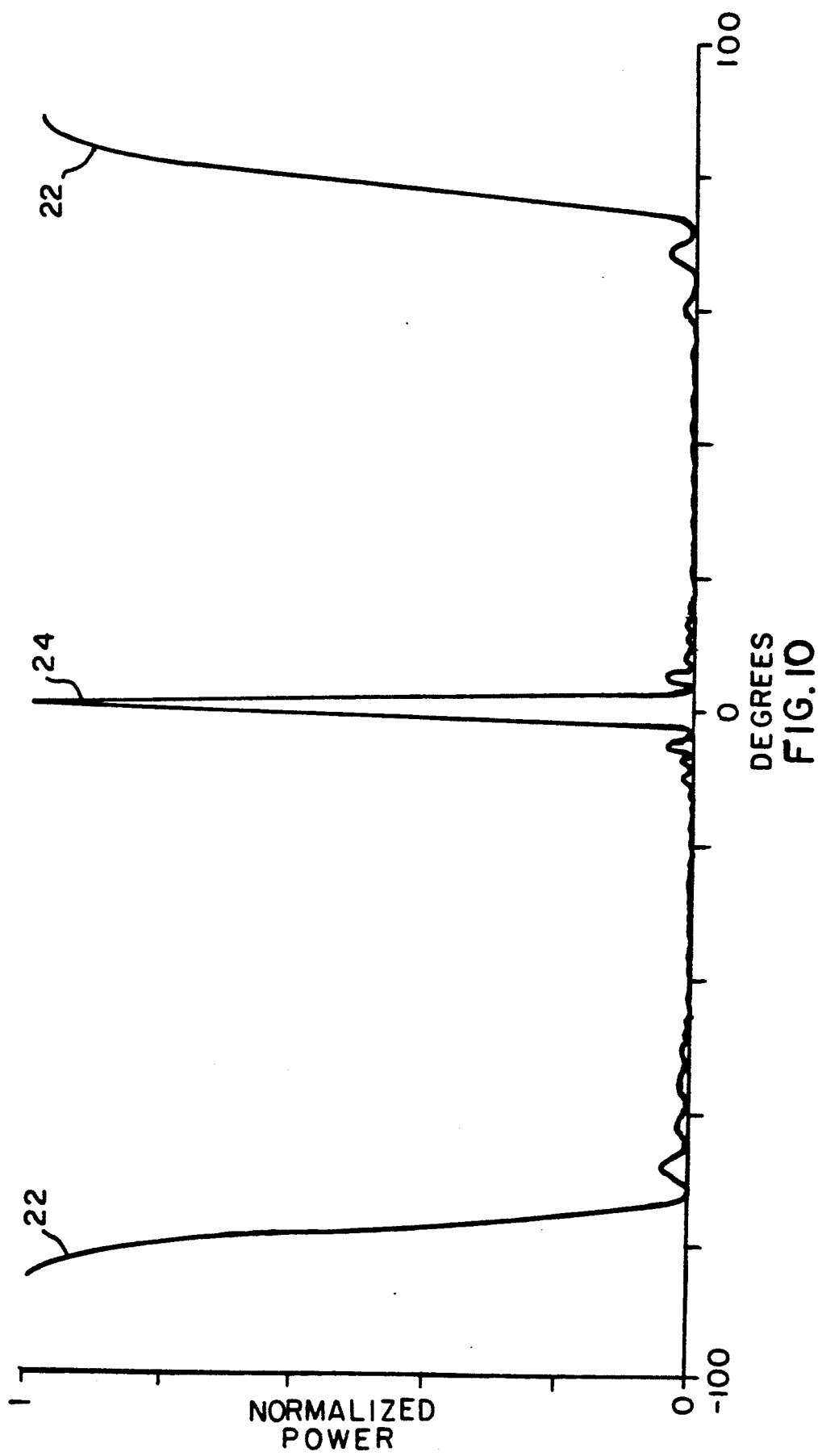
FIGS. 10 and 11 illustrate beam patterns in conjunction with grating lobes.
Figure 11:
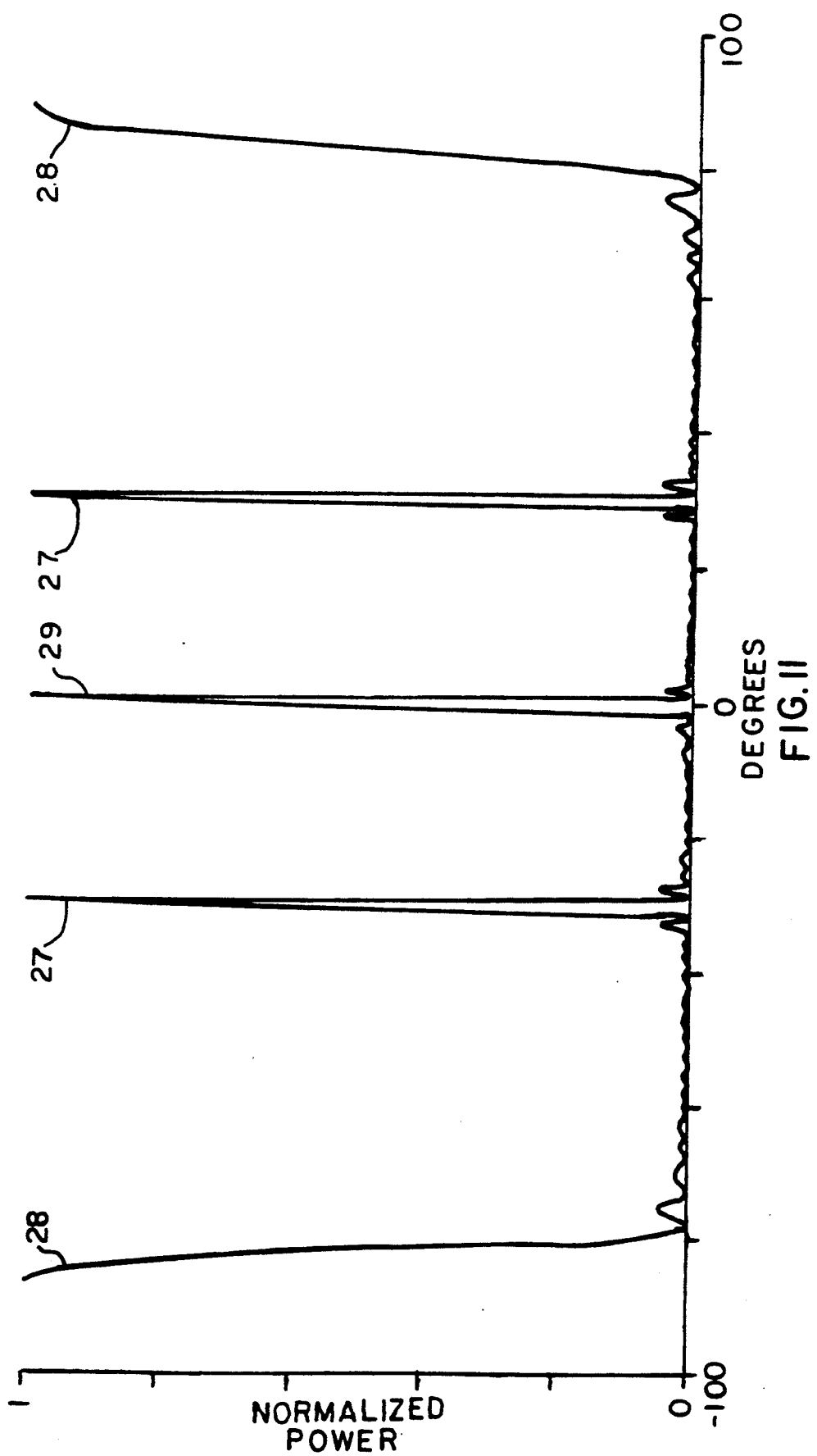

Whenever the spacing D between the receiver elements of an array becomes equal to or greater than $\lambda/2$, additional lobes can appear in the radiation beam pattern with amplitudes equal to that of the main beam. These lobes are called grating lobes and for a 20 element array with $D=0.5\lambda$ FIG. 10 illustrates a set of grating lobes 22 relative to the main beam 24, for a phase modulation factor of 2. With the phase modulation factor of 4, and as illustrated in FIG. 11, two sets of grating lobes 27 and 28 are produced relative to the main beam 29.

Grating lobes can lead to confusion since targets viewed by them cannot be distinguished from targets viewed by the main beam. The effects of grating lobes may be minimized or eliminated by using elements with directive radiation patterns and/or illuminating a target field such that the grating lobes fall outside of the illuminated field. Grating lobes may also be reduced or eliminated by populating the physical array with elements whose spacings are closer than $\lambda/2$. For instance, if the elements are spaced at $D=\lambda/8$ and $f_m=4$, then the elements have an effective spacing of $(f_m)(D)=\lambda/2$ after phase modulation, therefore the final beam response contains no grating lobes.

FIG. 12 illustrates, in block diagram form, one embodiment of the present invention. The receiver array is comprised of a plurality of receiver elements $R_1$ to $R_n$ each connected to a respective signal processing channel 30-1 to 30-$n$.

Examining signal processing channel 30-1 as exemplary, the output signal from receiver element $R_1$ is provided to a preamplifier 32, the output signal of which is converted to I and Q time varying signal components. This conversion is accomplished by means of multipliers 34 and 35 each of which receive the output signal from preamplifier 32 as well as a cosine function for multiplier 34 and a sine function for multiplier 35. The multiplication results in sum and difference frequencies, and low pass filters 38 and 39 are provided to pass only the difference frequency components.

The time varying I and Q signals are sampled and converted to digital form in repetitive sample cycles by means of respective analog-to-digital converters 40 and 41 with the process resulting in a digital sample $I_1$ produced by analog to digital converter 40 and the digital sample $Q_1$ produced by the analog-to-digital converter 41. The digitized $I_1$ and $Q_1$ samples are provided to a phase determining circuit 44 as well as an amplitude determining circuit 45, the output signals of which represent phase $\phi_1$ and amplitude $A_1$ of the signal and calculated as previously discussed with respect to FIGS. 4A and 4B.

In accordance with the present invention, the phase angle $\phi_1$ is modulated by a factor $f_m$ from source 48 by multiplication in multiplier 50, resulting in a modified phase angle $\phi'_1$ which is equal to $f_m\phi_1$. Modified I and Q samples $I_1'$ and $Q_1'$ are then derived by means of circuits 52 and 53 in accordance with the trigonometric relationship illustrated.

At each sample time, the modified I samples from all of the signal processing channels are collectively provided to a summing circuit 56 and the modified Q samples from all of the signal processing channels are collectively provided to a summing circuit 57. The summed signals are squared in respective squaring circuits 58 and 59 and combined in adder 60 which provides a resultant digital signal, representing the beamformed output at each sample time. This signal is processed by digital display driver 62 for presentation on display 64.

I claim:

1. Apparatus for synthetically elongating the length of an array of receiver elements to narrow the beamwidth associated with said array, comprising:
    a) a plurality of receiver elements arranged in an array for receiving energy reflected from a target in a target field;
    b) each said element being operable to provide a corresponding output signal in response to receipt of said energy;
    c) means for obtaining an indication of the phase angle of each said output signal;
    d) means for modulating all of said phase angles by a predetermined modulation factor, fm; and
    e) means for combining all of said signals whose phase angles have been so modified.

2. High resolution beamformer apparatus, comprising:
    a) a plurality of receiver elements arranged in an array for receiving energy reflected from a target in a target field;
    b) each said element being operable to provide a corresponding output signal in response to receipt of said energy;
    c) a plurality of signal processing channels each connected to receive the output signal of a respective one of said elements;
    d) each said signal processing channel including means for obtaining, in repetitive sampling cycles, the in phase (I) and quadrature (Q) components of a respective one of said output signals;
    e) said signal processing channels being operable to derive, from said I and Q components, a corresponding amplitude and phase angle of the sampled signal;
    f) means for multiplying the derived phase angle in each said signal processing channel by a constant phase modulation factor, fm, to derive a modified phase angle;
    g) said signal processing channels being operable to compute modified I and Q components utilizing said modified phase angle; and
    h) means for combining all of said modified I and Q components of all of said signal processing channels to derive target signals.

3. Apparatus according to claim 2 wherein:
    a) said means for obtaining said I and Q components include analog to digital converters to obtain said I and Q components in digital form.

4. Apparatus according to claim 3 wherein:
    a) said means for combining includes
        i) a first summing circuit operable to receive all of said I components of all of said signal processing channels to provide a summed I output signal,
        ii) a second summing circuit operable to receive all of said Q components of all of said signal processing channels to provide a summed Q output signal,
        iii) circuit means for squaring said summed I and Q output signals, and
        iv) means for combining said summed and squared I and Q output signals for display purposes.

5. Apparatus according to claim 2 wherein:
    a) said array of receiver elements is a straight line array.

* * * * *